(12) United States Patent
Yagi et al.

(10) Patent No.: US 6,787,962 B2
(45) Date of Patent: Sep. 7, 2004

(54) STARTER WITH OVERHEAT PROTECTION DEVICE INCLUDING BRUSH DEVICE

(75) Inventors: Katsunori Yagi, Tokyo (JP); Hirohide Ikeda, Tokyo (JP); Akio Seta, Tokyo (JP); Kazuhide Nishii, Tokyo (JP); Keiichi Kusumoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/944,172

(22) Filed: Sep. 4, 2001

(65) Prior Publication Data

US 2002/0096949 A1 Jul. 25, 2002

(30) Foreign Application Priority Data

Jan. 24, 2001 (JP) .......................................... 2001-016078

(51) Int. Cl.[7] .......................... H02P 9/04; H02K 11/00; H02K 5/00
(52) U.S. Cl. ........................ 310/245; 310/239; 310/248; 310/249; 310/251
(58) Field of Search ................................ 310/242, 248, 310/249, 251, 239, 245, 68 C, 89, 52

(56) References Cited

U.S. PATENT DOCUMENTS

| | | | | |
|---|---|---|---|---|
| 1,234,567 A | * | 7/1917 | Quigley | 2/141.1 |
| 3,654,504 A | * | 4/1972 | Susdorf et al. | 310/239 |
| 4,177,396 A | * | 12/1979 | Wang | 310/68 C |
| 4,215,346 A | * | 7/1980 | Smith, 2nd. | 342/404 |
| 4,561,237 A | * | 12/1985 | Van Maanen | 53/548 |
| 4,567,891 A | * | 2/1986 | Kanshin et al. | 606/153 |
| 4,600,850 A | * | 7/1986 | Mazzorana et al. | 310/242 |
| 4,658,321 A | * | 4/1987 | Lindner | 361/25 |
| 4,698,534 A | * | 10/1987 | Smith et al. | 310/89 |
| 4,900,966 A | * | 2/1990 | Winter et al. | 310/239 |
| 5,010,264 A | * | 4/1991 | Yamada et al. | 310/68 C |
| 5,089,735 A | * | 2/1992 | Sawaguchi et al. | 310/88 |
| 5,294,851 A | * | 3/1994 | Tajima et al. | 310/40 MM |
| 5,294,852 A | * | 3/1994 | Straker | 310/68 C |
| 5,414,318 A | * | 5/1995 | Shimizu et al. | 310/239 |
| 5,508,566 A | * | 4/1996 | Nagao et al. | 290/38 R |

(List continued on next page.)

FOREIGN PATENT DOCUMENTS

| | | | | |
|---|---|---|---|---|
| JP | 56-37441 | | 1/1955 | |
| JP | 56-141571 U | | 3/1955 | |
| JP | 62-64167 U | | 4/1987 | |
| JP | 02026253 | * | 1/1990 | .......... H02K/11/00 |
| JP | 5-211748 A | | 8/1993 | |
| JP | 5-300704 A | | 11/1993 | |
| JP | 5-91176 U | | 12/1993 | |
| JP | 9-126103 A | | 5/1997 | |
| JP | 2000-217314 A | | 8/2000 | |

*Primary Examiner*—Burton S. Mullins
*Assistant Examiner*—Heba Elkassabgi
(74) *Attorney, Agent, or Firm*—Sughrue Mion, PLLC

(57) ABSTRACT

The brush device of a starter with an overheat protection device of the present invention is provided with brush holders, brushes slidably supported in the brush holders, respectively, springs contacting one sides of the brushes to press the brushes in the radial, inner directions, and thermostats disposed on the brushes and adapted to interrupt energization of a starting motor with a power when the brushes exceed a predetermined temperature, caused by the starting motor continuously energized with the power supply.

11 Claims, 14 Drawing Sheets

U.S. PATENT DOCUMENTS

| | | | | |
|---|---|---|---|---|
| 5,600,193 A | * | 2/1997 | Matsushima et al. | 310/68 C |
| 5,659,211 A | * | 8/1997 | Blanchet | 310/239 |
| 5,675,307 A | * | 10/1997 | Krimm et al. | 337/107 |
| 5,731,650 A | * | 3/1998 | Scheucher | 310/248 |
| 5,742,498 A | * | 4/1998 | Taniguchi et al. | 363/145 |
| 5,760,485 A | * | 6/1998 | Shiga et al. | 290/38 R |
| 5,777,393 A | * | 7/1998 | Katoh et al. | 390/48 |
| 5,945,742 A | * | 8/1999 | Araki et al. | 290/38 R |
| 5,977,669 A | * | 11/1999 | Yoshida et al. | 310/68 D |
| 6,000,000 A | * | 12/1999 | Hawkins et al. | 707/201 |
| 6,028,381 A | * | 2/2000 | Yumiyama et al. | 290/38 C |
| 6,037,685 A | * | 3/2000 | Berfield | 310/68 C |
| 6,114,771 A | * | 9/2000 | Takagi et al. | 290/38 R |
| 6,188,154 B1 | * | 2/2001 | Luedtke et al. | 310/68 C |
| 6,326,716 B1 | * | 12/2001 | Niimi et al. | 310/239 |
| 6,452,295 B1 | * | 9/2002 | Iwamoto et al. | 310/68 C |

\* cited by examiner

STARTER WITH OVERHEAT PROTECTION DEVICE INCLUDING BRUSH DEVICE

BACKGROUND OF THE INVENTION

1. Field of the Invention

The present invention relates to a starter with an overheat-protection device including a brush device having a thermostat adapted to interrupt energization of a starting motor when a brush in the starting motor continuously energized exceeds a predetermined temperature due to self-heating of the brush, whereby the energization of the stating motor with a power supply is interrupted.

2. Description of the Related Art

FIG. 14 is a cross-sectional view of the essential part of a conventional starter. FIG. 15 is a perspective view of a heat-reception member shown in FIG. 14. FIG. 16 is an electric circuit diagram of the starter of FIG. 14.

In FIG. 14, a starting motor 1 comprises a shaft 2 rotatably supported by a bearing 5, an armature 3 fixed to the shaft 2, plural commutator pieces 4 arranged adjacently to the armature 3 and in the periphery of the shaft 2, brushes 6 having a substantially parallelepiped rectangular shape, in contact with the commutator pieces 4 at four positions thereof, and brush holders 7 slidably supporting the brushes 6.

The starting motor 1 is supported in a bracket 8. Bases 9 are fixed to the bracket 8. Each brush holder 7 is fixed to the base 9 via an insulation plate 10, which is an electric insulation member, and a heat-reception member 11 by means of rivets.

The heat-reception member 11, formed by working a brass flat sheet, contains a plane portion 11a having holes 11c for fixing the rivets, sandwiched between the brush holder 7 and the insulation sheet 10, and a thermostat-attachment portion 11b bent perpendicularly, immediately from the plane portion 11a, and extending therefrom.

A thermostat 12 is fixed to the thermostat-attachment portion 11b via an insulation tube 13 by means of an adhesion tape 14. The insulation tube 13 covers the thermostat 12 so that the thermostat 12 is prevented from directly contacting the heat-reception member 11. Thus, the electric insulation of the thermostat 12 from the brush 6 and the bracket 8 is secured.

The thermostat 12 comprises a case 15 and a bimetal 18 housed in the case 15. The bimetal 18, when the temperature exceeds a predetermined value, is bent-distorted to interrupt the energization.

In FIG. 16, the starter is provided with the starting motor 1, a battery 30 as a power supply, a start-switch 31 provided as a key switch, an auxiliary switch 32, the thermostat 12 connected in series with the auxiliary switch 32, and a magnet switch 36.

The auxiliary switch 32 comprises a pair of fixed contacts 33, a movable contact 34, and an excitation coil 35.

The magnet switch 36 comprises a pair of main fixed contacts 37, a main movable contact 38 interlocked with a plunger (not shown) to contact the main fixed contacts 37 and turn on-off a main current to the starting motor 1, an attraction coil 39 which becomes a resistor for a fine current flowing into the starting motor 1 till a pinion gear becomes engaged (for the time till the main movable contact 38 contacts the main fixed contact 37) and also having a function of generating an attraction force which causes the pinion gear (not shown) to be engaged with the ring gear of an internal combustion engine, and a holding coil 40 for holding the contact of the main movable contact 38 with a pair of the main fixed contacts 37.

From the thermostat 12, a lead wire 17 connected to an excitation coil 35, and also, a lead wire 16 connected to a connector 21 are led out, respectively.

Hereinafter, operation of the starter configured as described above will be described. First, when a driver turns on the start switch 31 by operation of the key switch, current flows from the battery 30 into the thermostat 12 and the excitation coil 35, so that the excitation coil 35 is excited. As a result, the movable contact 34 is moved, so that the fixed contacts 33 are electrically connected to each other, and the auxiliary switch 32 becomes on. At the same time, fine current flows from the battery 30 into the starting motor 1 via the attraction coil 39, so that the starting motor 1 is driven at a low rotation speed, and current also flows into the holding coil 40.

When the current flows into the attraction coil 39, an attraction force is generated in the attraction coil 39. With the attraction force, the plunger is moved, and a shift lever engaged and stopped at the end of the plunger is rotated to press the pinion gear toward the ring gear side of the internal combustion engine, so that the pinion gear is engaged with the ring gear. Also, the main movable contact 38 is interlocked with the plunger. The main movable contact 38 is interlocked with the plunger. When the pinion gear becomes normally engaged with the ring gear, the main movable contact 38 comes into contact with the main fixed contact 37, and main current from the battery 30 flows directly into the starting motor 1, so that the starting motor 1 is rotated, and the internal combustion engine starts.

After the internal combustion engine starts, the start switch 31 is turned off by driver's operation of the key switch, so that the energization of the auxiliary switch 32, the magnet switch 36, and the starting motor 1 by means of the battery 30 is interrupted. As a result, the attraction force at the attraction coil 39 becomes null, the engagement of the pinion gear with the ring gear is released, and rotation of the starting motor 1 stops.

In the event that the start switch 31 is not turned off, caused by a defect in return of the key switch or the like, so that current continues to flow from the battery 30 into the starting motor after the internal combustion engine starts, for example, there is the danger that thermal damages such as dielectric breakdown between the armature 1 and the commutator pieces 4 of the starting motor 1, or the like may occur.

To prevent such excessively continuous energization of the starting motor 1, the thermostat 12 is contained in the starter.

If current continues to flow in the starting motor 1 after the internal combustion engine starts, heat (hereinafter, referred to as brush heat) is generated in each of the brushes 6 so that the brush 6 have a high temperature. The heat is conducted to the thermostat 12 via the heat reception member 11 so that the temperature of the thermostat 12 rises. When the thermostat 12 reaches a predetermined temperature or higher, the bimetal 18 is bent-distorted to interrupt the energization, and the excitation of the excitation coil 35 becomes null. The movable contact 34 is separated from the fixed contact 33, and the auxiliary switch 32 becomes off. As a result energization of the attraction coil 39, the starting motor 1, and the holding coil 40 becomes null. Thus, thermal damages such as dielectric breakdown between the armature 3 and the commutation pieces 4 of the starting motor 1 can be prevented.

The insulation plate 10 is provided between the heat reception member 11 and the base 9. Thus, heat is suppressed from escaping from the base 9 side. Thus, the brush heat is ready to be conducted to the thermostat 12.

In the starter having the above-described configuration, the brush heat is conducted to the thermostat 12 via the heat reception member 11. However, since the heat reception member 11 has a heat resistance, and there is a distance between the brush 6 and the thermostat 12, the thermostat 12 can not quickly respond to a rise in temperature of the brush heat by any means. Accordingly, there arises the problem that current continues to flow in the starting motor 1 though the brush 6 exceeds a predetermined temperature, and thermal damages such as dielectric breakdown between the armature 1 and the commutator pieces of the starting motor 1 become severer.

As a countermeasure against the above problem, the response time of the thermostat operating based on the brush heat can be reduced by selecting such a bimetal as can operate at a lower temperature. For example, the response temperature of 120° C. to 150° C. can be reduced to 100° C. However, the starter is required to start an internal combustion engine in the high temperature environment at about 100° C., depending on the use conditions of the internal combustion engine. Accordingly, this countermeasure is unprofitable.

SUMMARY OF THE INVENTION

To solve the above-described problems, the present invention has been devised. It is an object of the present invention to provide a starter with an overheat-protection device including a brush device for securely preventing overheat of a starting motor.

To this end, according to the present invention, there is provided a starter with an overheat protection device including a brush device provided with brush holders, brushes slidably supported in the brush holders, respectively, springs contacting one faces of the brushes to press the brushes in the radial, inner directions, thermostats attached directly or indirectly to the brushes and adapted to interrupt energization of a starting motor caused by a power supply when the brushes exceed a predetermined temperature, caused by the starting motor continuously energized with the power supply.

DESCRIPTION OF THE PREFERRED EMBODIMENTS

Figure 14:
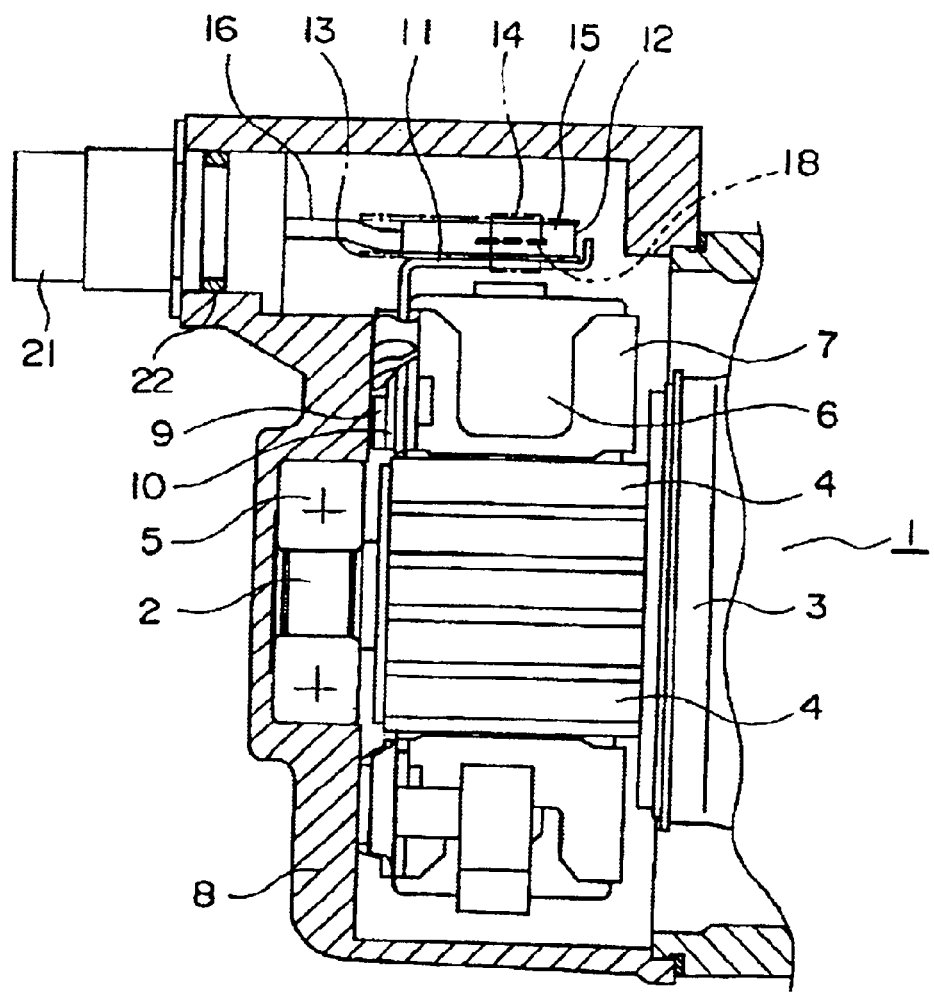
FIG. 14 is a cross sectional view of an essential part of a conventional starter with an overheat protection device.
Figure 15:
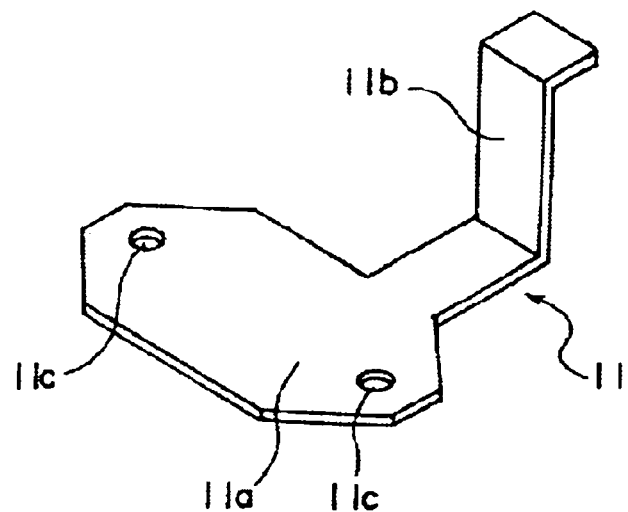
FIG. 15 is a perspective view of a heat reception member of the starter of FIG. 14.
Figure 16:
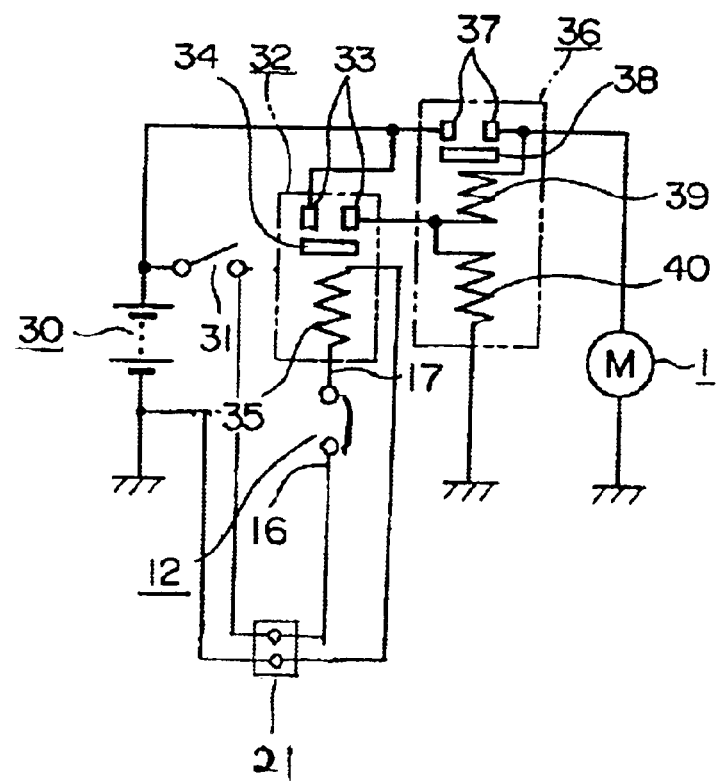
FIG. 16 is an electric circuit diagram of the starter of FIG. 14.

Hereinafter, the respective embodiments of the present invention will be described. The same or equivalent parts as those shown in FIGS. 14 to 16 are designated by the same reference numerals for description.

First Embodiment

Figure 1:
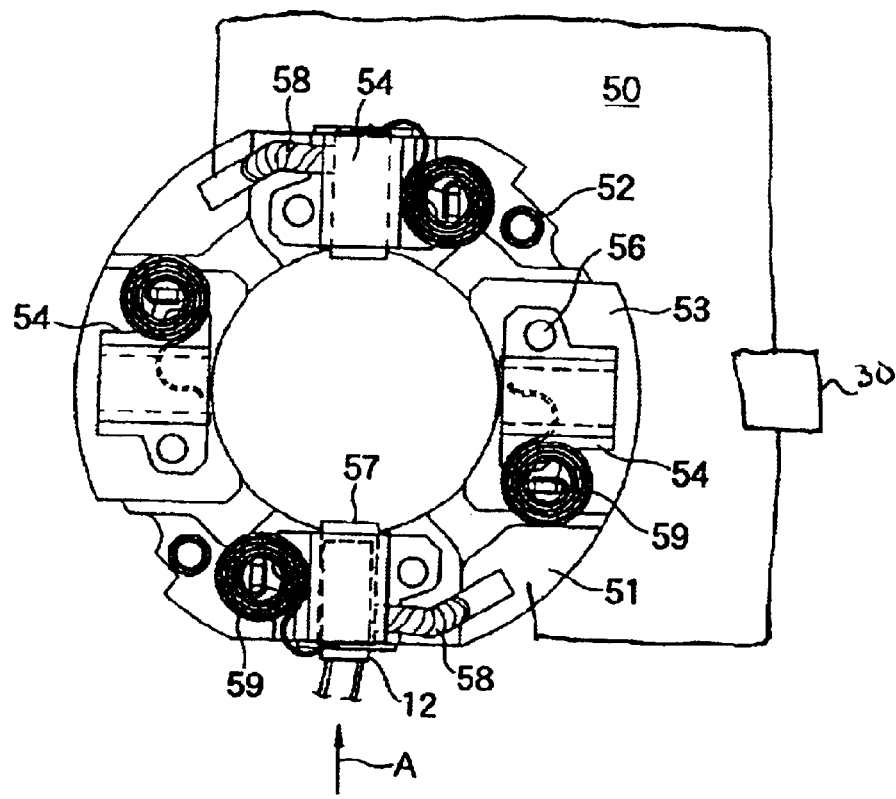
FIG. 1 is a front view of the brush device of a starter with an overheat protection device according to an embodiment of the present invention.
Figure 2:
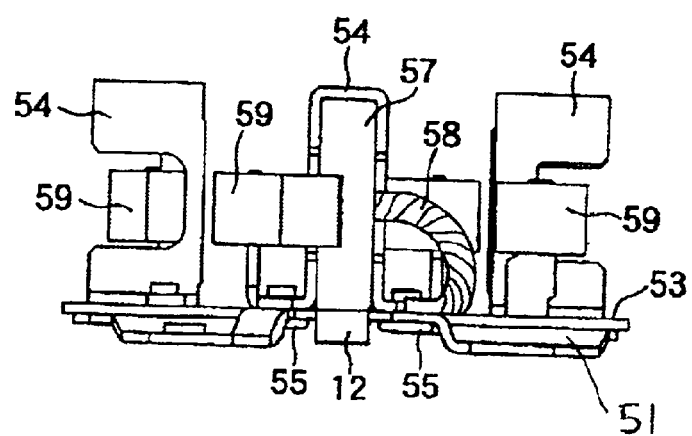
FIG. 2 is a side view of the brush device taken in the direction indicated by arrow A in FIG. 1.

FIG. 1 is a front view of a brush device 50 of a starter with an overheat protection device according a first embodiment of the present invention. FIG. 2 is a side view of the brush device 50 taken in the direction indicated by arrow A in FIG. 1.

In FIGS. 1 and 2, the brush device 50 is provided with bases 51 fixed to a bracket 8 of a starting motor by means of screws screwed into threaded holes 52, electric insulation plates 53 overlaid on the bases 51, brush holders 54 each having a U-shaped cross-section, with the insulation plates 53, fixed to the bases 51, brushes 57 each having a parallelepiped rectangular shape, slidabley supported in the radial directions in the brush holders 54, lead wires 58 having the tips connected to the brushes 57, springs 59 comprising spiral springs having tips contacting one sides of the brushes 57 so that the brushes 57 are pressed toward the commutator piece 4 sides, and thermostats 12 fixed to the sides opposite to the commutator piece 4 sides of the brushes 57, respectively.

In the brush device 50, the four brushes 57 contact the commutator pieces 4, due to the pressing forces of the springs 59 (two brushes are omitted in FIG. 1). Currents flow from the battery 30 into the armature 3 via the lead wires 58, the brushes 57, and the commutator pieces 4, so that the staffing motor 1 is rotated.

In the event that current continues to flow in the starting motor 1 after the internal combustion engine starts, for example, heat generated in each of the brush 57 (hereinafter, referred to brush heat) is conducted to the thermostat 12. When the thermostat 12 reaches a predetermined temperature or higher, the bimetal 18 is bent-distorted, so that the thermostat 12 interrupts the energization. Thus, the excitation of the excitation coils 35 become null. The movable contacts 34 are separated from the fixed contacts 33, and the auxiliary switches 32 become off. As a result, the energization of the starting motor 1 also becomes null, so that the rotation of the starting motor 1 stops.

In the first embodiment, the thermostat 12 is provided adjacently to the brush 57. Brush heat is conducted to the thermostat 12 in a short time. The temperature of the thermostats 12 rises substantially simultaneously with that of the brush 57. Thus, thermal damages such as dielectric breakdown between the armature 3 and the commutator pieces 4 of the starting motor 1 or the like can be securely prevented.

Second Embodiment

Figure 3:
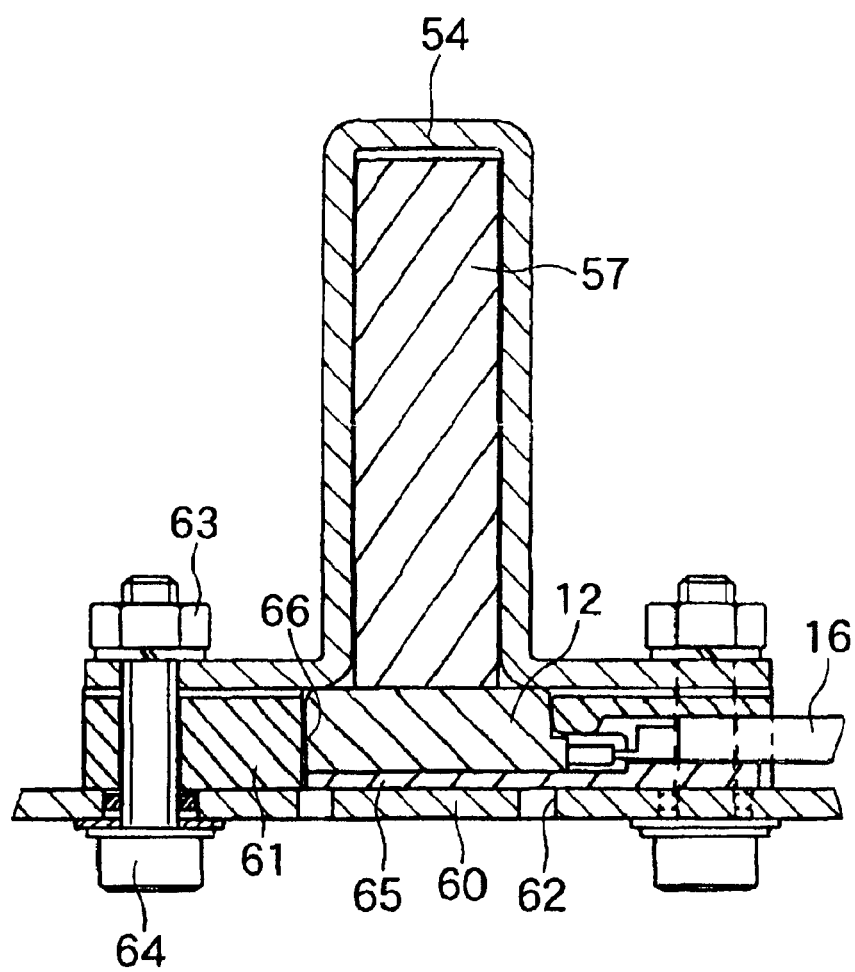
FIG. 3 is a side view showing an essential part of the brush device of a starter with an overheat protection device according to a second embodiment of the present invention.

FIG. 3 is a cross sectional view showing an essential part of the brush device of a starter with an overheat protection device according to a second embodiment of the present invention. In the second embodiment, a molding 61 made of a phenol resin having high heat resistance and electric insulation properties is provided. The thermostat 12 is disposed in a hole 66 formed in the molding 61 via an elastic rubber sheet 65. The brush 57 housed in the brush holder 54 is in contact with the thermostat 12. The brush holder 54 is fixed to the molding 61 and the base 60 by means of bolts 64 and nuts 63 as fastening means. Reference numeral 62 designates a hole for positioning the elastic sheet 65 in the hole 66 of the molding 65.

As material for the molding 61, a phenol resin is used. A material, provided that it has high heat resistance and insulation properties, may be employed, not limited to the phenol resin.

In the second embodiment, the thermostat 12 closely contacts the brush 57, caused by the elastic force of the elastic sheet 65, and is positioned with respect to the brush 57 by use of the molding 61. Accordingly, brush heat can be conducted to the thermostat 12 securely in a short time.

Third Embodiment

Figure 4:
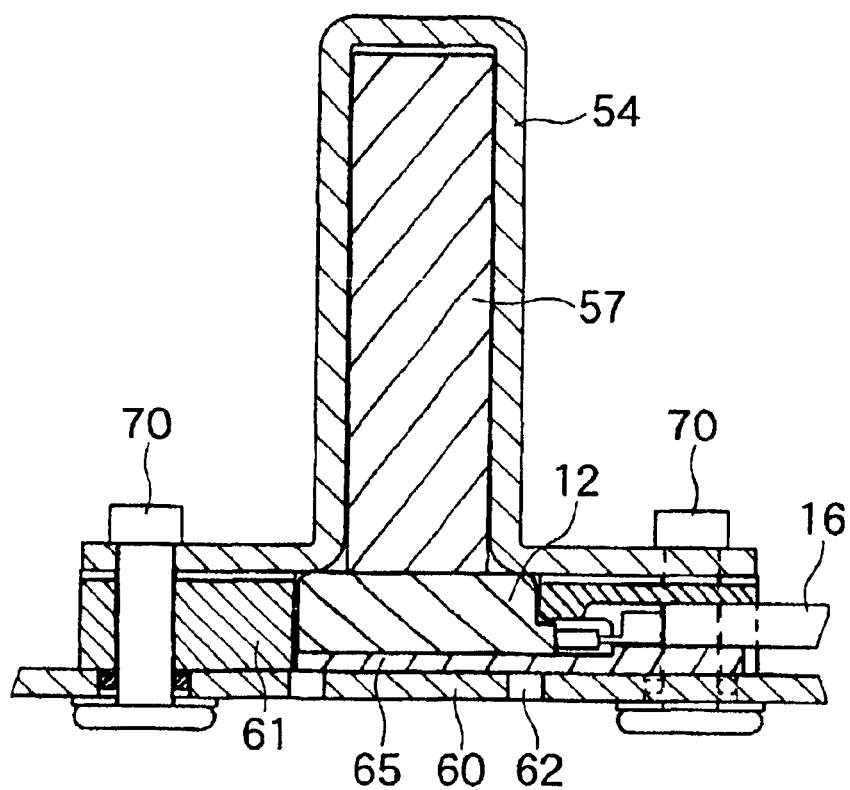
FIG. 4 is a cross sectional view showing an essential part of the brush device of a starter with an overheat protection device according to a third embodiment of the present invention.

FIG. 4 is a cross sectional view showing an essential part of the brush device of a starter with an overheat protection device according to a third embodiment of the present invention. The third embodiment is similar to the second embodiment except that rivets 70 are used instead of the nuts 63 and the bolts 64 as fastening means.

The use of the rivets 70 enhance the building-in properties of the molding 61, the thermostat 12, the brush 57, and the brush holder 54 with respect to the base 60 as compared with the second embodiment.

Fourth Embodiment

Figure 5:
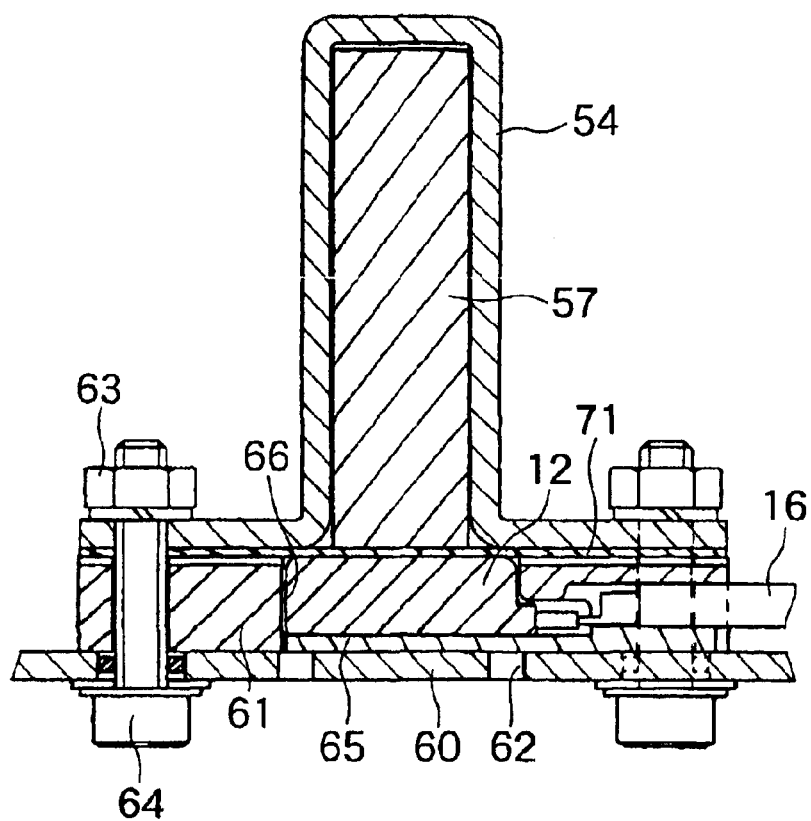
FIG. 5 is a cross sectional view showing an essential part of the brush device of a starter with an overheat protection device according to a fourth embodiment of the present invention.

FIG. 5 is a cross sectional view showing an essential part of the brush device of a starter with an overheat protection device according to a fourth embodiment of the present invention. The fourth embodiment is similar to the second embodiment except that a flat sheet 71 having a high thermal conduction property, e.g., made of copper, is interposed between the brush 57 and the thermostat 12.

The interposition of the flat sheet 71 changes the conditions under which heat is conducted from the brush 57 to the thermostat 12, and thereby, the operation time of the thermostat 12 can be controlled.

Fifth Embodiment

Figure 6:
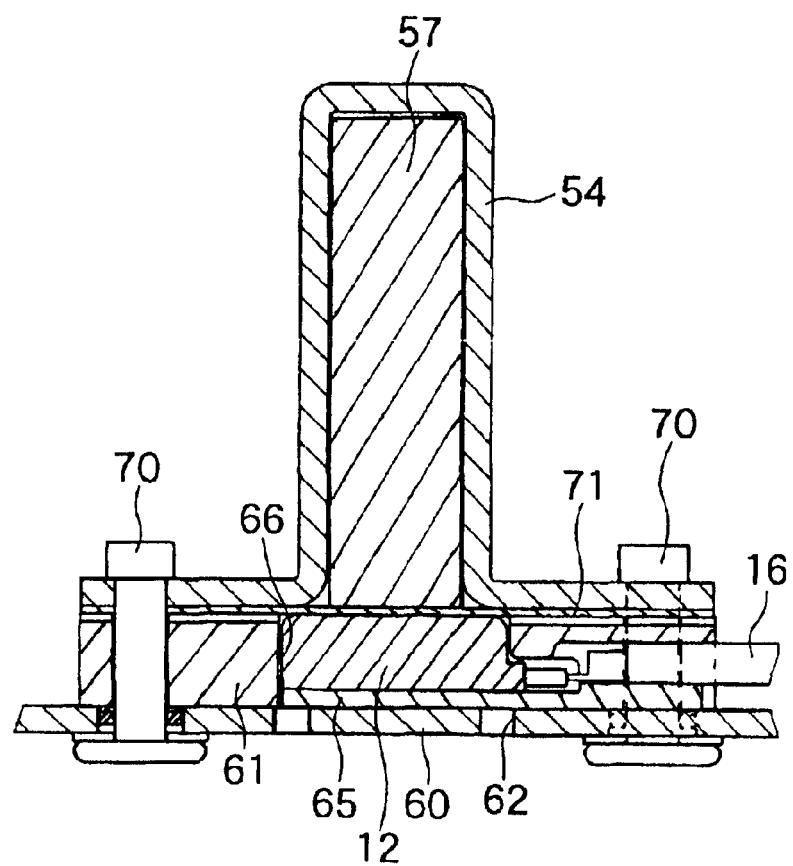
FIG. 6 is a cross sectional view showing an essential part of the brush device of a starter with an overheat protection device according to a fifth embodiment of the present invention.

FIG. 6 is a cross sectional view showing an essential part of the brush device of a starter with an overheat protection device according to a fifth embodiment of the present invention. The fifth embodiment is similar to the fourth embodiment except that the rivets 70 are used instead of the nuts 63 and the bolts 64.

The use of the rivets 70 enhance the building-in properties of the molding 61, the thermostat 12, the flat sheet 71, the brush 57, and the brush holder 54 with respect to the base 60 as compared with the fourth embodiment.

Sixth Embodiment

Figure 7:
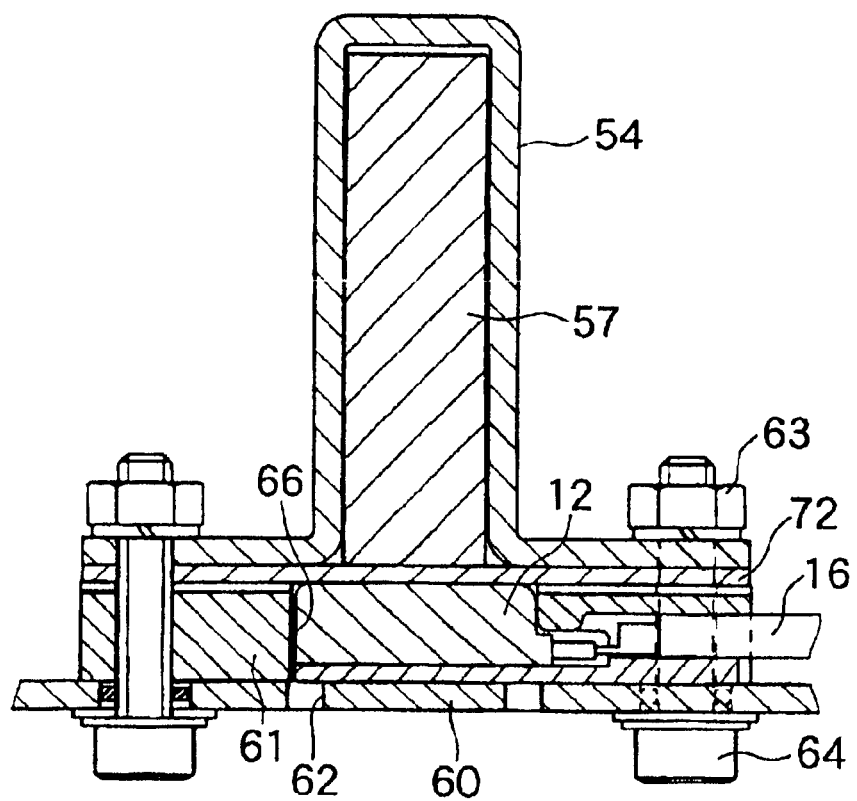
FIG. 7 is a cross sectional view showing an essential part of the brush device of a starter with an overheat protection device according to a sixth embodiment of the present invention.

FIG. 7 is a cross sectional view showing an essential part of the brush device of a starter with an overheat protection device according to a sixth embodiment of the present invention. The sixth embodiment is similar to the fourth embodiment except that a flat sheet 72 with a high thermal conduction property interposed between the brush 57 and the thermostat 12 has a changed thickness.

Since the thickness of the flat sheet 72 is changed as described above, the conditions under which heat is conducted from the brush 57 to the thermostat 12 are changed, and thereby, the operation time of the thermostat 12 can be controlled. Also, similar advantages can be obtained by changing the material of the flat sheet.

Seventh Embodiment

Figure 8:
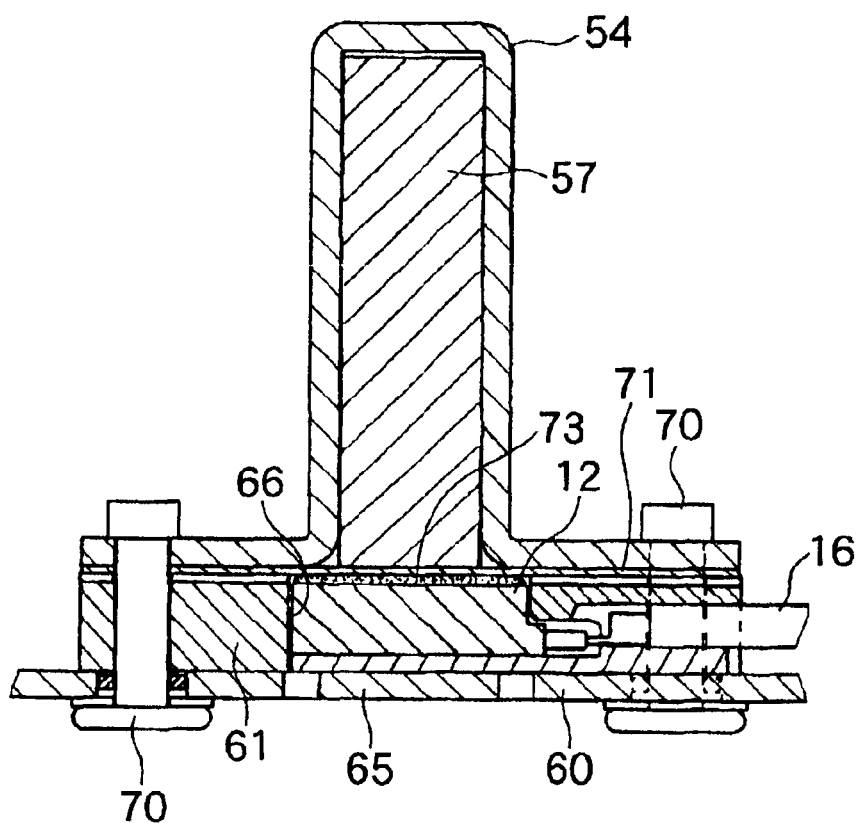
FIG. 8 is a cross sectional view showing an essential part of the brush device of a starter with an overheat protection device according to a seventh embodiment of the present invention.

FIG. 8 is a cross sectional view showing an essential part of the brush device of a starter with an overheat protection device according to a seventh embodiment of the present invention. The seventh embodiment is similar to the fifth embodiment except that the flat sheet 71 and the thermostat 12 are bonded to each other by means of an adhesive 73. As the adhesive 73, a liquid silicone rubber capable of being cured in a short time by heating to have high thermal conduction and elastic properties is used.

Needless to say, the adhesive 73 is not limited to the above material.

Since the flat sheet 71 and the thermostat 12 are bonded to each other by means of the adhesive 73, conduction of heat between the flat sheet 71 and the thermostat 12 can be stabilized.

Eighth Embodiment

Figure 9:
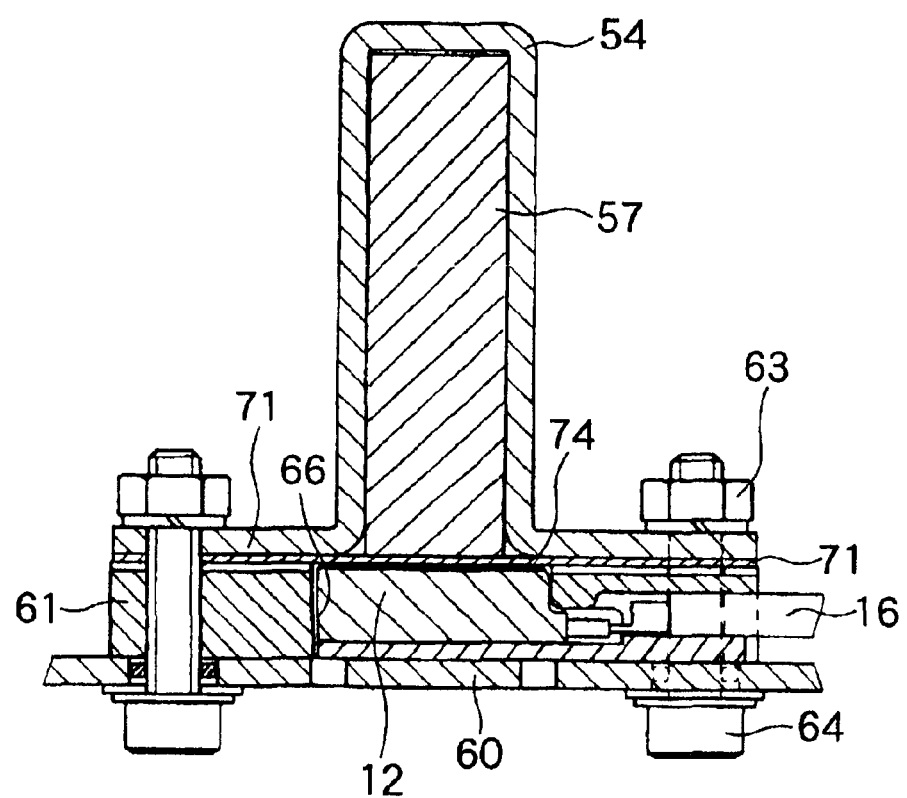
FIG. 9 is a cross sectional view showing an essential part of the brush device of a starter with an overheat protection device according to an eighth embodiment of the present invention.

FIG. 9 is a cross sectional view showing an essential part of the brush device of a starter with an overheat protection device according to an eighth embodiment of the present invention. The eighth embodiment is similar to the fifth embodiment except that the flat sheet 71 and the thermostat 12 are welded to each other by means of a solder 74.

Since the flat sheet 71 and the thermostat 12 are soldered to each other by means of the solder 74 as described above, conduction of heat between the flat sheet 71 and the thermostat 12 can be stabilized.

The welding may be carried out by use of another brazing material instead of the solder 74.

Ninth Embodiment

Figure 10:
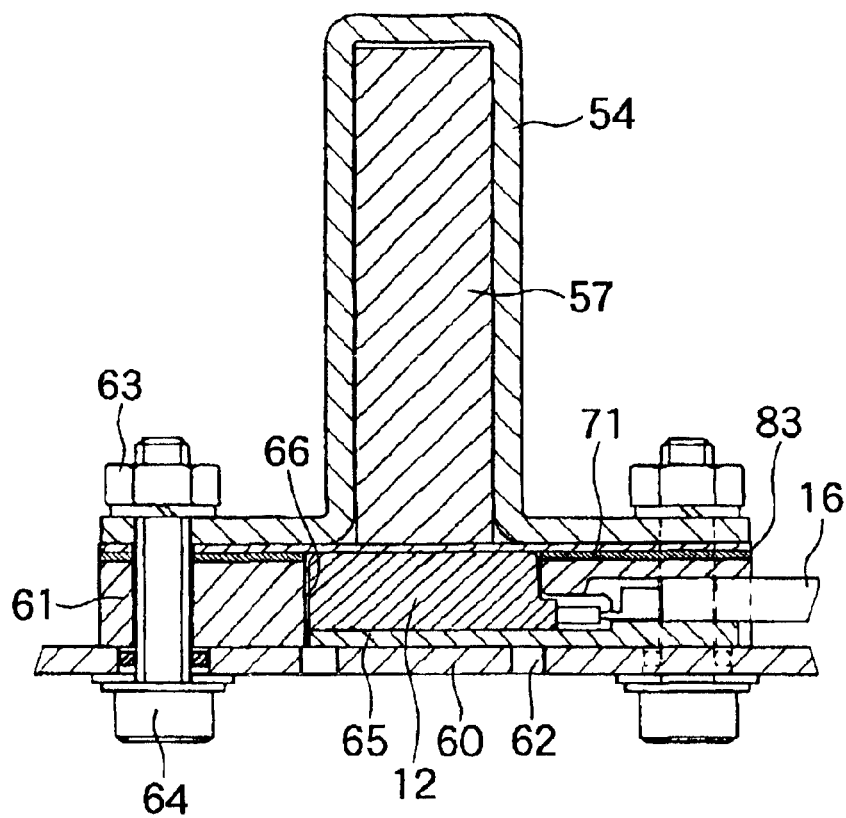
FIG. 10 is a cross sectional view showing an essential part of the brush device of a starter with an overheat protection device according to a ninth embodiment of the present invention.

FIG. 10 is a cross sectional view showing an essential part of the brush device of a starter with an overheat protection device according to a ninth embodiment of the present invention. The ninth embodiment is similar to the fourth embodiment except that a thermal-insulation sheet 83 with a low thermal conduction property is provided between the molding 61 and the flat sheet 71.

In the ninth embodiment, the thermal insulation sheet 83 is provided. Therefore, the brush heat flowing toward the molding 61 is interrupted by the thermal insulation sheet 83, so that thermal deterioration of the molding 61 can be suppressed.

In the brush devices of the starters of the embodiments excluding the flat sheets 71 and 72, the thermal deterioration of the molding 6, caused by the brush heat, can be prevented by providing the thermal insulation sheet 83 between the brush holder 54 and the molding 61.

Tenth Embodiment

Figure 11A:
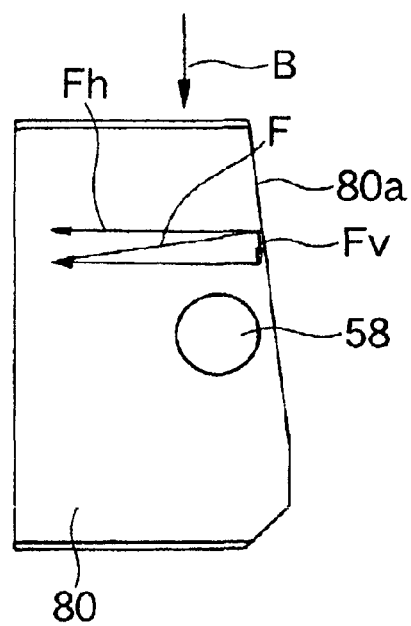
FIG. 11A is a front view of a brush of the brush device of a starter with an overheat protection device according to a tenth embodiment of the present invention.
Figure 11B:
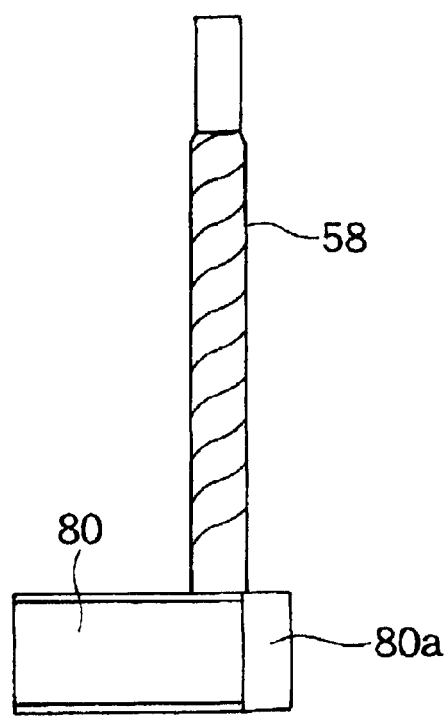
FIG. 11B is a view of the brush taken in the direction indicated by arrow B in FIG. 11A.

FIG. 11A is a front view of a brush 80 of the brush device of a starter with an overheat protection device according to a tenth embodiment of the present invention. FIG. 11B is a view of the brush 80 taken in the direction indicated by arrow B in FIG. 11A.

For example, in the case of the brush device of the starter according to the fourth embodiment of the present invention, the brush 57 has a rectangular parallelepiped shape, and the contact face of the spring 59, which is the end thereof contacting the brush 57, is a plane perpendicular to the flat sheet 71. For this reason, an elastic force of the spring 59 applied to the brush 80 acts in the direction parallel to the plane of the flat sheet 71. Accordingly, the elastic force of the spring 59 makes no contribution to the contact pressure of the brush 80 to the flat sheet 71.

In the tenth embodiment, on the spring-contact face, an inclined face 80a is formed, which is inclined with respect to the vertical plane extending vertically from the base 60.

For example, when an elastic force F from the spring 59 vertically acts on the inclined face 80a, a force component Fh acts as a pressing force of the brush 80 for the commutator pieces 4. The other force component Fv acts as a pressing force of the brush 80 for the flat sheet 71 of the brush 57. That is, the elastic force F of the spring 59 can increase the contact pressure of the brush 80 for the flat sheet 71 and stabilize conduction of heat from the brush 80 to the flat sheet 71.

Moreover, in the brush devices of the starters according to the embodiments excluding the flat sheets 71 and 72, the elastic force of the spring 59 enhances the contact pressure of the brush 80 for the thermostat 12, and conduction of heat from the brush 80 to the thermostat 12 can be stabilized that much more.

Eleventh Embodiment

Figure 12B:
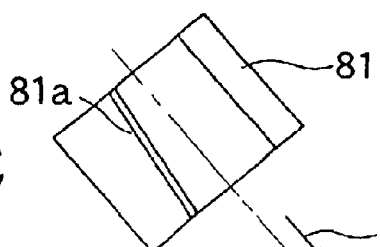
FIG. 12B is a view of the spring taken in the direction indicated by arrow C in FIG. 12A.
Figure 12C:
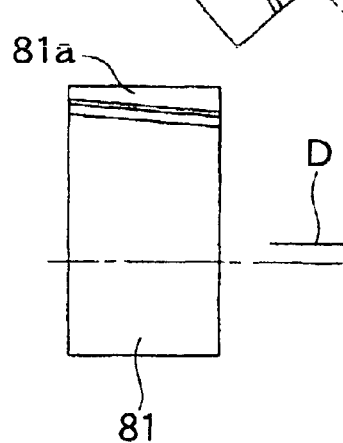
FIG. 12C is a view of the spring 81 taken in the direction indicated by arrow D in FIG. 12A.
Figure 12A:
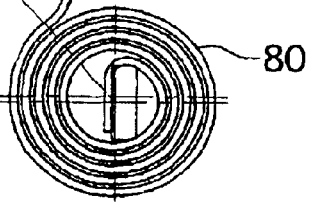
FIG. 12A is a front view of a spring of the brush device of a starter with an overheat protection device according to an eleventh embodiment of the present invention.

FIG. 12A is a front view of a spring 81 of the brush device of a starter with an overheat protection device according to an eleventh embodiment of the present invention. FIG. 12B is a view of the spring 81 taken in the direction indicated by arrow C in FIG. 12A. FIG. 12C is a view of the spring 81 taken in the direction indicated by arrow D in FIG. 12A.

In the tenth embodiment, the inclined face 80a is formed on the brush 80. In the eleventh embodiment, an inclined face 81a is formed on the spring 81 so as to be parallel to the inclined face 80a of the brush 80. The elastic force of the spring 81 comprising a spiral spring is transmitted to the brush 80 while the inclined face 81a of the spring 81 is in contact with the inclined face 80a of the brush 80. That is, the contact area between the brush 80 and the spring 81 is increased that much more. Thus, the elastic force of the spring 81 is stably transmitted to the brush 80.

Twelfth Embodiment

Figure 13:
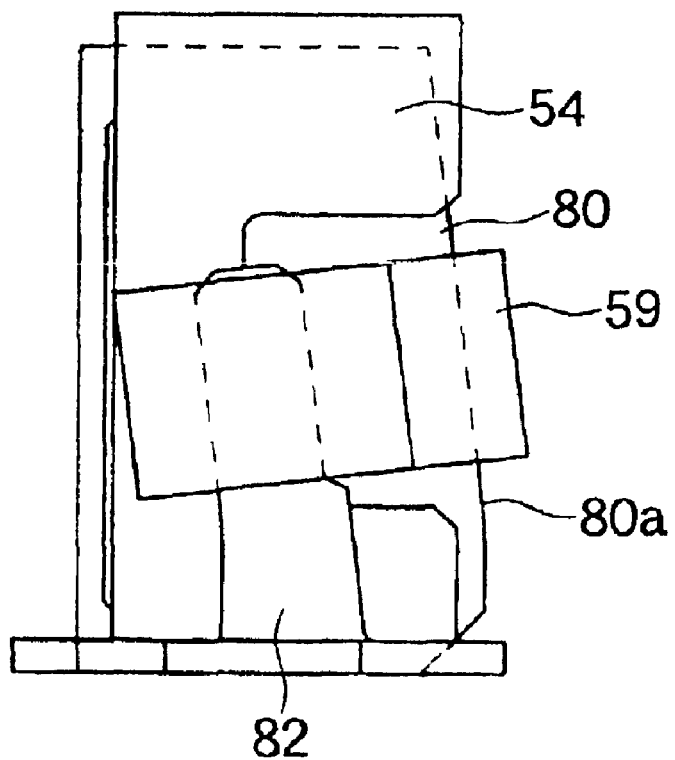
FIG. 13 is a partial front view of the brush device of a starter with an overheat protection device according to a twelfth embodiment of the present invention.

FIG. 13 is a partial front view of the brush device of a starter with an overheat protection device according to a twelfth embodiment of the present invention. In the twelfth embodiment, the spring 59 is supported by a support 82 elongating from the base 60 in inclination to the vertical line therefrom, and the end of the spring 59 contacts the inclined face 80a of the brush 80.

In the twelfth embodiment, the support 82 is inclined. Therefore, the whole area of the end of the spring 59 contacts the inclined face 80a of the brush 80. The contact area between the brush 80 and the spring 59 is increased that much more, and the elastic force of the spring 59 is stably transmitted to the brush 80.

In the above-described embodiments, the spring comprising a spiral spring are described. Needless to say, the spring is not limited to the spiral spring.

As described above, a starter with an overheat protection device including a brush device according to one aspect of the present invention provides with brush holders, brushes slidably supported in the brush holders, respectively, springs contacting one faces of the said brushes to press the brushes in the radial, inner directions, thermostats attached directly or indirectly to the brushes and adapted to interrupt energization of a starting motor caused by a power supply when the brushes exceed a predetermined temperature, caused by the starting motor continuously energized with the power supply. Thus, heat generated in the brushes is conducted to the thermostats in a short time. The responsibility of the thermostats to a rise in temperature of the brushes is enhanced. When the brushes exceed a predetermined temperature, energization for the starting motor is quickly interrupted, thermal damages such as dielectric breakdown between the armature and the commutator pieces of the starting motor can be securely prevented.

According to one form of the starter with an overheat protection device including a brush device, each of the thermostats may be provided in a hole of a molding with a heat resistance attached to a base fixed to a bracket of the starting motor, so as to contact said brush. Thus, the thermostat can be securely located at a predetermined position.

According to one form of the starter with an overheat protection device including a brush device, an elastic sheet may be interposed between the base and the thermostat. Thus, the elastic force of the elastic sheet causes the thermostat to closely contact the brush, so that conduction of heat from the brush to the thermostat can be stabilized.

According to another form of the starter with an overheat protection device including a brush device, a flat sheet with a high thermal conduction property may be provided between the brush and the thermostat. Thus, the conditions under which heat is conducted from the brush to the thermostat can be easily changed by changing the thickness and material of the flat sheet, and thereby, the responsibility of the thermostat can be easily modified.

According to still another form of the starter with an overheat protection device including a brush device, the thermostat and the flat sheet may be bonded to each other by means of an adhesive with a high thermal conduction property. Thus, the thermal conduction between the thermostat and the flat sheet can be stabilized.

According to still another form of the starter with an overheat protection device including a brush device, the thermostat and the flat sheet may be joined together by solder-welding. Thus, the thermal conduction between the thermostat and the flat sheet can be stabilized.

According to still another form of the starter with an overheat protection device including a brush device, a thermal insulation sheet may be provided between the brush holder and the molding. Thus, heat flowing toward the molding is interrupted by means of the thermal insulation sheet, suppressing thermal deterioration of the molding.

According to still another form of the starter with an overheat protection device including a brush device, an inclined face may be formed on one face of the brush contacting the spring, so as to apply the elastic force of the spring also on the thermostat side. Thus, since the elastic force of the spring also acts on the thermostat side via the brush, the contact pressure of the brush for the thermostat is increased. Thus, conduction of heat from the brush to the thermostat can be stabilized.

According to still another form of the starter with an overheat protection device including a brush device, in the end of the spring contacting one face of the brush, an inclined portion contacting the inclined face of the spring may be formed. Thus, the contact area between the brush and the spring is increased. Therefore, the elastic force of the spring can be stably transmitted to the brush.

According to still another form of the starter with an overheat protection device including a brush device, the spring may be supported by a support elongating from the base in inclination to the vertical line therefrom, so that the end of the spring contacts along said inclined face of the brush. Thus, the whole area of the end of the spring contacts the inclined face of the brush. The contact area between the brush and the spring is increased that much more. Thus, the spring force of the spring can be stably transmitted to the brush.

According to still another form of the starter with an overheat protection device including a brush device, at least the base, the molding, and the brush holder may be joined together by means of a fastening means elongating through the base, the molding, and the brush holder. Thus, the base, the molding, and the brush holder can be securely joined together.

According to still another form of the starter with an overheat protection device including a brush device, the fastening means may be a rivet. Thus, the building-in properties of the molding, the thermostat, the brush, and the brush holder with respect to the base are improved.

What is claimed is:

1. A starter with an overheat protection device including a brush device provided with
   brush holders,
   brushes slidably supported in said brush holders, respectively,
   springs contacting one faces of said brushes to press said brushes in the radial, inner directions,
   thermostats attached directly or indirectly to said brushes and adapted to interrupt energization of a starting motor caused by a power supply when said brushes exceed a predetermined temperature, caused by said starting motor continuously energized with said power supply, and wherein each of said thermostats is provided in a hole of a molding with a heat resistance attached to a base fixed to a bracket of said starting motor, so as to contact said brush.

2. A starter with an overheat protection device including a brush device according to claim 1, wherein an elastic sheet is interposed between said base and said thermostat.

3. A starter with an overheat protection device including a brush device according to claim 1, wherein a thermal insulation sheet is provided between said brush holder and said molding.

4. A starter with an overheat protection device including a brush device according to claim 1, wherein at least said base, said molding, and said brush holder are joined together by means of a fastening means elongating through said base, said molding, and said brush holder.

5. A starter with an overheat protection device including a brush device according to claim 4, wherein said fastening means is a rivet.

6. A starter with an overheat protection device including a brush device provided with
   brush holders,
   brushes slidably supported in said brush holders, respectively,
   springs contacting one faces of said brushes to press said brushes in the radial, inner directions,
   thermostats attached directly or indirectly to said brushes and adapted to interrupt energization of a starting motor caused by a power supply when said brushes exceed a predetermined temperature, caused by said starting motor continuously energized with said power supply, wherein a flat sheet with a high thermal conduction property is provided between said brush and said thermostat.

7. A starter with an overheat protection device including a brush device according to claim 6, wherein said thermostat and said flat sheet are bonded to each other by means of an adhesive with a high thermal conduction property.

8. A starter with an overheat protection device including a brush device according to claim 6, wherein said thermostat and the flat sheet are joined together by solder-welding.

9. A starter with an overheat protection device including a brush device provided with
   brush holders,
   brushes slidably supported in said brush holders, respectively,
   springs contacting one faces of said brushes to press said brushes in the radial, inner directions,
   thermostats attached directly or indirectly to said brushes and adapted to interrupt energization of a starting motor caused by a power supply when said brushes exceed a predetermined temperature, caused by said starting motor continuously energized with said power supply, wherein an inclined face is formed on one face of said brush contacting said spring, so as to apply said elastic force of said spring also on said thermostat side.

10. A starter with an overheat protection device including a brush device according to claim 9, wherein in the end of said spring contacting one face of said brush, an inclined portion contacting said inclined face of said spring is formed.

11. A starter with an overheat protection device including a brush device according to claim 9, wherein said spring is supported by a support elongating from said base in inclination to the vertical line therefrom, so that the end of said spring contacts along said inclined face of said brush.

* * * * *